United States Patent
Wawrzola et al.

(10) Patent No.: US 11,408,559 B2
(45) Date of Patent: Aug. 9, 2022

(54) AUTOMATIC LUBRICATOR FOR LUBRICATING AN OBJECT

(71) Applicant: Dodge Acquisition Co., Oxford, CT (US)

(72) Inventors: Grzegorz Wawrzola, Kielce (PL); Daniel Lewandowski, Cracow (PL); Eric Lambert, Central, SC (US); Greg Hewitt, Taylors, SC (US); Artur Rdzanek, Simponsville, SC (US)

(73) Assignee: Dodge Industrial, Inc., Oxford, CT (US)

( * ) Notice: Subject to any disclaimer, the term of this patent is extended or adjusted under 35 U.S.C. 154(b) by 270 days.

(21) Appl. No.: 16/730,180

(22) Filed: Dec. 30, 2019

(65) Prior Publication Data
US 2021/0199242 A1 Jul. 1, 2021

(51) Int. Cl.
*F16N 11/08* (2006.01)
*F16N 29/02* (2006.01)
*F16N 19/00* (2006.01)

(52) U.S. Cl.
CPC .............. *F16N 11/08* (2013.01); *F16N 19/00* (2013.01); *F16N 29/02* (2013.01); *F16N 2270/70* (2013.01)

(58) Field of Classification Search
CPC . F16N 11/08; F16N 7/14; F16N 29/02; F16N 2270/70
See application file for complete search history.

(56) References Cited

U.S. PATENT DOCUMENTS

| 3,267,371 A | 8/1966 | Greve |
| 5,271,528 A * | 12/1993 | Chien ..................... F16N 11/08 |
| | | 184/38.4 |

(Continued)

FOREIGN PATENT DOCUMENTS

| CN | 208457553 | 2/2019 |
| DE | 102011053027 | 2/2013 |
| KR | 1020150117158 | 10/2015 |

OTHER PUBLICATIONS

International Search Report and Written Opinion, Counter PCT Counter Appln. No. PCT/US20/67328, dated Mar. 26, 2021, 10 pgs.

(Continued)

*Primary Examiner* — Michael R Mansen
*Assistant Examiner* — Mark K Buse
(74) *Attorney, Agent, or Firm* — Murtha Cullina LLP (57) ABSTRACT

An automatic lubricator for lubricating an object. The lubricator includes a housing with a coupling section configured to couple with a lubricant container containing a lubricant. The lubricant container includes a rotatable shaft with a piston to dispense the lubricant from an output of the lubricant container. An electric motor is configured to drive the rotatable shaft of the lubricant container during at least one lubrication action, such that at least a part of the lubricant is dispensable from the lubricant container during the at least one lubrication action. At least one sensor is arranged within the housing and configured to provide a sensor signal indicative of a distance between the at least one sensor and the piston of the lubricant container, and a control circuitry configured to determine, based on the sensor signal, at least one lubrication parameter indicative of the at least one lubrication action.

21 Claims, 2 Drawing Sheets

(56) References Cited

U.S. PATENT DOCUMENTS

| | | | | |
|---|---|---|---|---|
| 5,732,794 A * | 3/1998 | Orlitzky | | F16N 11/08 184/27.1 |
| 5,971,229 A * | 10/1999 | May | | F16N 11/08 222/327 |
| 6,012,551 A * | 1/2000 | Raab | | F16N 11/08 184/7.4 |
| 6,125,969 A * | 10/2000 | Graf | | F16N 11/08 184/105.1 |
| 6,216,822 B1 * | 4/2001 | May | | F16N 11/08 184/105.1 |
| 6,408,985 B1 * | 6/2002 | Orlitzky | | F16N 11/08 184/105.2 |
| 6,561,316 B1 * | 5/2003 | Graf | | F16C 19/525 184/38.4 |
| 8,915,331 B2 * | 12/2014 | Alekseyev | | H02P 7/08 184/105.2 |
| 2002/0079335 A1 * | 6/2002 | Kramer | | F16N 11/08 222/333 |
| 2002/0079336 A1 * | 6/2002 | Weigand | | F16N 11/08 222/389 |
| 2003/0076119 A1 | 8/2003 | Horz et al. | | |
| 2004/0099483 A1 * | 5/2004 | Song | | F16N 11/08 184/105.1 |
| 2004/0129499 A1 * | 7/2004 | Okpokowuruk | | F16N 11/08 184/26 |
| 2004/0155068 A1 * | 8/2004 | Weigand | | F16N 11/08 222/333 |
| 2007/0114834 A1 | 6/2007 | Matzan | | |
| 2007/0289994 A1 * | 12/2007 | Kotyk | | F16N 7/385 222/41 |
| 2008/0230318 A1 * | 9/2008 | Eisenbacher | | F16N 11/00 184/37 |
| 2008/0271949 A1 | 11/2008 | Tokuyama et al. | | |
| 2010/0217446 A1 * | 8/2010 | Orlitzky | | F16N 13/10 700/283 |
| 2011/0005866 A1 * | 1/2011 | Paluncic | | F16N 25/00 184/26 |
| 2011/0153094 A1 * | 6/2011 | Botha | | F16N 11/00 700/283 |
| 2011/0253481 A1 * | 10/2011 | Lin | | F16N 11/08 184/108 |
| 2012/0132484 A1 * | 5/2012 | Guillaume | | F16N 11/08 184/37 |
| 2013/0168187 A1 * | 7/2013 | Conley | | F16N 7/38 184/6 |
| 2013/0168188 A1 * | 7/2013 | Donovan | | F16N 7/38 184/6 |
| 2014/0224587 A1 * | 8/2014 | Orlitzky | | F16N 11/08 184/37 |
| 2014/0374449 A1 * | 12/2014 | Eisenbacher | | F16N 11/08 222/333 |
| 2016/0290558 A1 * | 10/2016 | Kuijpers | | F16N 29/04 |
| 2016/0327208 A1 * | 11/2016 | Lehnert | | H02P 7/00 |
| 2016/0334058 A1 * | 11/2016 | Yang | | F16N 13/14 |
| 2016/0369782 A1 | 12/2016 | Lee | | |
| 2021/0199240 A1 | 7/2021 | Wawrzola et al. | | |
| 2021/0199241 A1 | 7/2021 | Wawrzola et al. | | |

OTHER PUBLICATIONS

International Search Report and Written Opinion, PCT Counter Appln. No. PCT/US20/67330, dated Mar. 26, 2021, 8 pgs.
International Search Report and Written Opinion, PCT Counter Appln. No. PCT/US20/67331, dated Mar. 26, 2021, 11 pgs.

* cited by examiner

AUTOMATIC LUBRICATOR FOR LUBRICATING AN OBJECT

TECHNICAL FIELD

The present invention relates to an automatic lubricator and/or lubrication device for lubricating an object. The invention further relates to a lubrication system comprising such lubricator, a method of operating such lubricator, a computer program, and a non-transitory computer-readable medium storing such computer program.

TECHNICAL BACKGROUND

Automatic lubricators, lubrication devices and/or lubrication systems are usually used for ensuring a smooth and reliable operation of an apparatus, engine, device and/or industrial system by lubricating one or more objects, parts, portions and/or members thereof. Such objects, parts, portions and/or members can, for example, be and/or comprise a bearing, a shaft or the like.

Generally, an automatic lubricator can automatically apply lubricant onto and/or into the object that should be lubricated during one or more lubrication actions, e.g. at a specified lubrication time, with a certain lubrication frequency and/or in certain lubrication time intervals. This can render a manual application of the lubricant unnecessary and hence allow to reduce maintenance effort and costs. Therein, a selection of an appropriate lubricant and/or time of lubrication can prevent a failure of the object, the apparatus, engine, device and/or the industrial system, thereby allowing to extend the lifetime thereof.

SUMMARY

According to the present disclosure, there is provided an improved lubricator that provides improved and/or enhanced functionality, e.g. in terms of reliably, quickly, efficiently and/or accurately determining one or more lubrication parameters.

This is achieved by the subject matter of the independent claims, wherein further embodiments are incorporated in the dependent claims, the following description and the appended figures.

According to a first aspect of the present disclosure, there is provided an automatic, automated and/or at least partly automated lubricator for lubricating an object. Generally, the lubricator may refer to a lubrication device configured to apply lubricant onto and/or into at least a part of the object. The lubricator comprises a housing with a coupling section configured to couple with a lubricant container for containing and/or containing a lubricant, wherein the lubricant container comprises a rotatable shaft with a piston to dispense the lubricant from an output and/or outlet of the lubricant container. The lubricator further comprises an electric motor configured to drive the rotatable shaft of the lubricant container during at least one lubrication action, such that at least a part of the lubricant is dispensable, can be dispensed and/or is dispensed from the lubricant container during the at least one lubrication action. The lubricator further comprises at least one sensor arranged within the housing and configured to provide a sensor signal indicative, representative and/or descriptive of a distance between the at least one sensor and the piston of the lubricant container. Further, the lubricator comprises a control circuitry configured to determine and/or monitor, based on the sensor signal of the at least one sensor and/or based on processing the sensor signal, at least one lubrication parameter indicative, descriptive and/or representative of the at least one lubrication action. Therein, the control circuitry may be configured to derive the at least one lubrication parameter from the sensor signal of the at least one sensor.

As will be further described in the following, by means of the at least one sensor and/or the sensor signal that is indicative of the distance between the sensor and the piston, one or more lubrication parameters can be reliably, fast, efficiently, cost-efficiently and accurately determined. Further, by arranging the sensor in the housing of the lubricator, the lubricator can be used with different containers and/or different types of containers, which may for example differ in size, geometry, shape, volume of lubricant contained therein, or the like. Also, by arranging the sensor in the housing of the lubricator, the sensor can be used irrespective of a replacement of the container. In other words, the container can be replaced without replacing the sensor. Accordingly, the sensor may be physically and/or mechanically disconnected from the container itself, e.g. such that the sensor may be independent from the lubricant container and can be re-used even if the lubricant container has been replaced. Accordingly, costs of the sensor may not be connected and/or associated with the container or a replacement thereof.

Additionally, during e.g. the replacement of the lubricant container, no additional effort may be needed, such as e.g. fixing the sensor to the lubricant container. This, in turn, may reduce maintenance effort and cost.

Here and in the following, the "object" can refer to any part, portion and/or member that should be lubricated. For instance, the object can refer to a movable part of an apparatus, device, system and/or industrial system, such as e.g. a motor, an engine or the like. Such a movable part can, for example, be a bearing, a shaft, a drive shaft or the like.

In the context of the present disclosure the at least one sensor may refer to a dedicated sensor for determining, measuring, monitoring and/or detecting a distance between the sensor and the piston. Alternatively or additionally, the sensor may refer to a distance sensor for determining the distance between the piston and the at least one sensor.

It should be noted, however, that the sensor signal indicative of the distance between the sensor and the piston may be indicative of and/or correlate with a distance between the piston and any other static part of the lubricator, such as e.g. an end of the lubricator, an end of the electric motor, the housing of the lubricator, an immovable control part of the lubricator, the control circuitry of the lubricator and/or any other static part of the lubricator.

The at least one sensor is arranged in and/or within the housing. This may mean that the sensor is mounted and/or built inside the housing. In other words, the sensor may be at least partly surrounded and/or encompassed by the housing. Alternatively or additionally, the sensor may be arranged in an interior volume of the lubricator, which interior volume may be defined by the housing of the lubricator.

Generally, the sensor may be arranged and/or attached to any component and/or part of the lubricator, such as e.g. a wall of the housing of the lubricator, a housing of the electric motor, an end of the electric motor, a printed circuit board of the lubricator, which may e.g. comprise at least a part of the control circuitry, the control circuitry, an immovable control part of the lubricator and/or any other part and/or component of the lubricator. For instance, the sensor may be arranged adjacent and/or at an end of the electric motor, such that the at least one sensor opposes and/or faces the piston of the lubricant container, when the lubricant container is coupled to the housing. Accordingly, the at least one sensor may be arranged adjacent and/or at an end of the electric motor, which end opposes and/or faces the piston. Alternatively or additionally, the at least one sensor may be arranged adjacent and/or at a further end of the electric motor, which further end is arranged opposite to the end of the electric motor that faces the piston. Alternatively or additionally, the at least one sensor may be arranged adjacent and/or at a printed circuit board of the lubricator, which may e.g. comprise at least a part of the control circuitry.

The coupling section of the housing can be configured for being coupled to the lubricant container or at least a part thereof. For instance, the coupling section of the housing can be configured for being detachably attached and/or mechanically coupled to the lubricant container. Alternatively or additionally, the coupling section can be configured for engaging with at least a part of the lubricant container. The lubricant container and the coupling section may, for instance, be coupled via a threaded coupling or any other suitable coupling allowing to attach and/or detach the container to the housing.

The lubricant container (also referred to as "container") can refer to any type of container, cartridge, can and/or tank configured to store and/or contain a lubricant. The rotatable shaft of the container can, for example, refer to a rotatable screw. The piston of the container can be displaceably arranged on, attached to and/or mounted to the rotatable shaft of the lubricant container. By rotation of the rotatable shaft, the piston can be moved and/or displaced along the rotatable shaft, e.g. in direction towards the output and/or outlet of the container, such that lubricant can at least partly be pushed and/or moved by the piston out of the output of the container to lubricate the object.

The electric motor can be an arbitrary type of electric motor, such as e.g. a DC motor, an AC motor, a brushed motor or a brushless motor. The electric motor can be supplied with electrical power by a power supply of the lubricator. The power supply can be connected to a supply grid or it can comprise one or more batteries and/or accumulators.

The control circuitry may refer to a control circuit, a controller and/or a control unit configured to actuate and/or control the electric motor. Therein, at least a part of the control circuitry may for example be arranged on a printed circuit board. The control circuitry may be coupled to the electric motor by one or more electric lines. The control circuitry may be configured to switch-on the electric motor. For instance, the control circuitry may switch-on the electric motor by activating the power supply for supplying electrical power to the electric motor and/or by coupling the electric motor to the power supply, e.g. based on actuating a switch arranged in a supply line connecting the power supply and the electric motor. Further, the control circuitry may be configured to switch-off the electric motor. The electric motor may be switched-off by the control circuitry e.g. by deactivating the power supply and/or by decoupling the electric motor from the power supply.

Further, the lubricator can comprise a data storage and/or data storage device. The data storage may be part of and/or may be coupled to the control circuitry. The control circuitry may further comprise one or more processors, e.g. one or more microcontrollers or the like. The data storage may store software instructions and/or a computer program, which, when executed by the one or more processors of the control circuitry instructs the lubricator to perform the functional features and/or functionalities described above and in the following with reference to the lubricator.

In the context of the present disclosure the term "lubrication action" may refer to a state of the lubricator, in which the electric motor is actuated by the control circuitry, supplied with electrical power, powered and/or driven by electrical power. Accordingly, the lubrication action may refer to and/or be indicative of a time period and/or a lubrication time period, during which the electric motor is actuated by the control circuitry, supplied with electrical power, powered and/or driven with electrical power by the control circuitry (and/or the power supply). During the lubrication action, a certain amount of lubricant may be dispensed by the lubricator. Depending on a condition or state of the lubricant container, such as e.g. a blockage of the output, however, dispensing of lubricant may be (partly or completely) blocked, although the electric motor is actuated and/or powered. Accordingly, the term "lubrication action" can be accompanied by and/or result in dispensing a certain amount of lubricant or it can be accompanied by and/or result in powering the electric motor without dispensing lubricant, e.g. in the case of a complete blockage of the output. Both scenarios are referred to as lubrication action in the present disclosure. In other words, a lubrication action may comprise dispensing of lubricant and may comprise a lubrication attempt, during which the electric motor is actuated, but no lubricant can be dispensed, e.g. because of an output blockage, because the lubricant container is empty, because of a malfunction of the container, because of an erroneous coupling of the container to the lubricator, because no lubricant container is coupled to the lubricator or the like. Further, the term at least a part of the lubrication action may refer to a partial or the entire time period of the lubrication action (and/or lubrication time period).

In the context of the present disclosure, the at least one lubrication parameter is indicative of, representative of and/or descriptive of the at least one lubrication action. Therein, the at least one lubrication parameter may, generally, refer to an operational parameter or parameter descriptive, representative, and/or indicative of an operation of the lubricator and/or an operation of at least a part of the lubricator, such as e.g. the electric motor. Alternatively or additionally, the at least one lubrication parameter may be descriptive, representative, and/or indicative of a status, a state, a condition and/or a working condition of the lubricator and/or at least a part thereof, such as e.g. an idle state, a running state, a normal working condition and/or an abnormal working condition. Alternatively or additionally, the at least one lubrication parameter may refer to an operational parameter descriptive, representative, and/or indicative of an operation of the container and/or an operation of at least a part of the container, such as e.g. a rotation of the rotatable shaft, a movement of the rotatable shaft, a displacement of the piston and/or a movement of the piston. Moreover, the at least one lubrication parameter may be indicative of, descriptive of and/or representative of a state, a status and/or a condition of the lubricant container, such as e.g. an amount of lubricant contained and/or remaining in the container.

Generally, the present invention may be considered as being based on the following insights and findings. It may be desirable to increase an efficiency and reliability of an object and/or a system or apparatus comprising the object, such as e.g. an industrial system. Preferably, an automatic lubricator should be able to detect, determine and/or monitor one or more lubrication parameters, such as e.g. an amount of lubricant dispensed from the lubricator and/or from the container during one or more lubrication actions, a level of lubricant remaining in the container, a level of lubricant contained in the container, an error, a failure, a malfunction and/or an abnormal work condition of the lubricator and/or the container coupled thereto. Such abnormal working condition can for example be a lubricant container output blockage, which may prevent proper dispensing of the lubricant from the container and could lead to insufficient lubrication of the object. Determining the one or more lubrication parameters may, for example, prevent a situation which could possibly adversely affect the object and/or the system or apparatus comprising the object. In turn, this could shorten a lifetime of the object and/or the system or apparatus comprising the object.

The control circuitry may be configured to determine and/or monitor, based on the sensor signal and/or based on processing the sensor signal, the distance between the sensor and the piston and/or the distance between the piston and any other part or component of the lubricator. By determining and/or monitoring the distance between the sensor (and/or any part of the lubricator) and the piston in accordance with the lubricator of the present invention, the one or more lubrication parameters can be determined and/or monitored. In particular, the one or more lubrication parameters can be determined and/or monitored in a reliable, fast, efficient, cost-efficient and accurate manner, independent on other work conditions, such as e.g. vibration, moisture and/or temperature. In other words, a reliable detection and/or monitoring of the lubrication parameter(s) that is independent on environmental conditions, such as e.g. vibration, moisture and/or temperature at the site of the lubricator, can be ensured by the lubricator according to the present disclosure. Therein, the term "monitoring" of the distance and/or the at least one lubrication parameter may mean determining the distance and/or the at least one lubrication parameter over time, e.g. continuously or in certain time intervals. Further, by means of the lubricator according to the present disclosure, the cost of determining the lubrication parameter(s) as well as costs involved with replacement of the container can be minimized, since, for example, no additional time-consuming action like manual fixing of the sensor to the lubricant container may be required, e.g. when the container is replaced. Also, the invention can be used to advantage with different types of containers, independent on their, type, geometry, dimension, volume and/or length.

By way of example, the control circuitry may be configured to determine, measure and/or monitor, based on the sensor signal of the at least one sensor, a displacement of the piston (e.g. during one or more lubrication actions) and/or a position of the piston, e.g. relative to a static part of the lubricator, such as e.g. an end of the lubricator, an end of the electric motor, the housing of the lubricator, a housing of the electric motor, an immovable control part of the lubricator, a drive part of the lubricator, the control circuitry of the lubricator, a printed circuit board of the lubricator and/or any other static part of the lubricator. Based on the displacement of the piston and/or the position of the piston, the control circuitry may derive, determine and/or monitor the one or more lubrication parameters.

By way of example, the displacement and/or position of the piston may be indicative of a level or amount of lubricant contained in the container. Accordingly, by determining and/or monitoring the displacement and/or position of the piston, the level of lubricant inside the container can be determined and/or monitored. While the lubricant gets dispensed, the distance between the motor and the piston may increase and a determination and/or measurement of this distance can be used to assess how much lubricant is left in the container. Optionally, based on information on the type of the container, such as for example a maximum displacement of the piston for said type of container, it can be determined and/or predicted when the container is empty. Also, a signal and/or warning signal can be generated upon detection and/or determination that the container is empty.

According to an embodiment, the at least one lubrication parameter is indicative of at least one of an abnormal working condition of the lubricator, an abnormal working condition of the lubricant container, a blockage of the output of the lubricant container, an amount of lubricant dispensed during at least a part of the at least one lubrication action, an accumulated amount of lubricant dispensed from the lubricant container in a plurality of lubrication actions, an amount of lubricant remaining in the lubricant container, a lubrication time period for the at least one lubrication action, a lubrication frequency, and a time (or time period) between consecutive lubrication actions. Accordingly, based on the sensor signal of the at least one sensor one or more lubrication parameters providing information about the lubrication action and/or the condition of the lubricator and/or the condition of the container can be determined. Therein, one lubrication parameter can be derived from another lubrication parameter. For instance, the amount of lubricant dispensed during the at least one lubrication action actually performed can be determined and added to an amount of lubricant dispensed during one or more previous lubrication actions in order to determine the accumulated amount of lubricant. This can allow to derive comprehensive information about the lubrication action, the lubricator and/or the container based on the sensor signal and/or based on processing the sensor signal.

Therein, the abnormal working condition of the container and/or the lubricator may refer to a working condition, in which an actual amount of lubricant dispensed during the lubrication action differs from a pre-defined and/or target amount of lubricant, e.g. an amount that should be dispensed during the lubrication action. This can comprise dispensing more lubricant as well as less lubricant than the pre-defined amount of lubricant. For instance, the output and/or outlet of the container may be completely or partially blocked resulting in a reduction of the actual amount of lubricant dispensed during the lubrication action.

Further, the blockage of the output may refer to a partial blockage or a complete blockage of the output. The lubrication time period may refer to and/or denote the time period of the lubrication action, i.e. the time during which the electric motor is actuated by the control circuitry, is switched-on, powered, driven and/or supplied with electric power by the control circuitry (and/or the power supply). The lubrication time period may be given as the time difference between a termination time of the lubrication action, at which the lubrication action is terminated, and a start time of the lubrication action, at which the lubrication action was started or initiated.

It should be noted that the present disclosure is not limited to the lubrication parameters listed above. Rather, any other lubrication parameter that is determinable based on the sensor signal can alternatively or additionally be determined. For instance, a normal working condition, such as e.g. a condition in which the actual amount of lubricant dispensed matches the pre-defined and/or target amount, and/or a start time of a subsequent lubrication action can be determined based on the sensor signal.

According to an embodiment, the control circuitry is configured to determine the at least one lubrication parameter based on at least one container parameter, wherein the at least one container parameter is indicative of at least one of a type of the lubricant container, a capacity of the lubricant container, a volume of the lubricant container, an initial volume of lubricant stored in the lubricant container, a geometry of the lubricant container, a shape of the lubricant container, a height of the lubricant container, and a diameter of at least a part of the lubricant container. By way of example, based on the at least one container parameter and based on the sensor signal, the amount dispensed during the lubrication action can be calculated. Further, taking into account an initial volume of lubricant in a container and the actual amount dispensed from said container during the lubrication action (or an accumulated amount of lubricant dispensed during a plurality of lubrication actions), the amount of lubricant remaining in the container after performing the lubrication action can be calculated. Also, a lifetime of the container may be determined e.g. based on the frequency of lubrication actions.

According to an embodiment, the at least one sensor is arranged adjacent an end of the electric motor, such that the at least one sensor opposes and/or faces the piston of the lubricant container, when the lubricant container is coupled to the housing. Arranging the sensor close to and/or at the end of the electric motor facing the piston, the distance between the sensor and the piston may be reliably determined by the control circuitry, e.g. because a region between the sensor and the piston may not be obscured or blocked by other components of the lubricator. In turn this can allow for a reliable determination of the one or more lubrication parameters. Also, by arranging the sensor at the motor's end that faces the piston, the lubricator may be provided in a compact form and may be produced in a cost-efficient manner. It should be noted, however, that the sensor can alternatively be arranged at any other, e.g. static, component and/or part of the lubricator.

According to an embodiment, the at least one sensor is mechanically coupled to the end of the electric motor, wherein the end of the electric motor faces and/or opposes the piston of the lubricant container, when the lubricant container is coupled to the housing of the lubricator. The sensor may, for example, be arranged at, mounted to and/or fixed at a static part of the electric motor, such as e.g. a stator and/or a housing of the motor.

According to an embodiment, the lubricator further comprises at least one wave guide having a first end and a second end opposite to the first end, wherein the first end of the wave guide is coupled to the at least one sensor and the second end of the wave guide is directed towards the piston. Therein, the at least one sensor is configured to transmit and/or emit a measurement signal through the at least one wave guide and to receive, via the at least one wave guide, a reflected signal component of the measurement signal reflected on the piston and/or a surface thereof. Accordingly, the sensor may emit the measurement signal into the wave guide in a direction towards the piston. The measurement signal may then pass through the wave guide, wherein at least a part or component of the measurement signal may be reflected on the piston and/or a surface thereof. The reflected part or component of the measurement signal may pass through the wave guide back to the sensor, where it is received as the reflected signal component of the measurement signal. The sensor may then determine the sensor signal indicative of the distance between the sensor and the piston based on the reflected signal component and/or based on the measurement signal. By way of example, the sensor signal may be indicative of a time-of-flight of the measurement signal and the reflected signal component thereof. In this context, it should be noted that the sensor can be part of the control circuitry and the control circuitry can be configured to determine the sensor signal based on the reflected signal component and/or based on the measurement signal. Generally, the at least one wave guide may refer to any structure, e.g. a tunnel-like structure, allowing passage of at least a part of the measurement signal therethrough. The at least one wave guide may for example refer to a fiber optics, a channel, a measurement signal channel, or any other suitable structure.

According to an embodiment, the at least one sensor is at least one of a time-of-flight sensor, a laser sensor, an optical sensor, an ultrasound sensor, and a Radar sensor. These types of sensors may allow for a compact design of the lubricator, while ensuring a reliable detection and/or determination of the at least one lubrication parameter.

According to an embodiment, the control circuitry is configured to determine, based on the sensor signal of the at least one sensor, a first distance between the at least one sensor of the lubricator and the piston of the lubricant container before performing and/or initiating the lubrication action and a second distance between the at least one sensor of the lubricator and the piston of the lubricant container after performing at least a part of the lubrication action or the entire lubrication action and/or upon termination of at least a part of the lubrication action or the entire the lubrication action. Therein, the control circuitry is configured to determine an amount of lubricant dispensed from the lubricant container during the at least part of the lubrication action or the entire lubrication action based on the determined first distance and the second distance. By determining the distance between the senor before the lubrication action and after at least a part of the lubrication action or the entire lubrication action, the displacement of the piston during the at least part of lubrication or the entire the lubrication action can be determined. In turn, this may allow to compute and/or calculate the amount of lubricant dispensed during the at least part of the lubrication action or the entire lubrication, e.g. based on one or more container parameters. Further, determining the amount of lubricant dispensed during the at least part of the lubrication or the entire lubrication may allow to ensure that the object is sufficiently lubricated and/or may allow calculation of the amount of lubricant remaining in the container.

According to an embodiment, the control circuitry is configured to determine an amount of lubricant remaining in the lubricant container after performing the at least part of the lubrication action or the entire lubrication action based on subtracting the determined amount of lubricant dispensed during the at least part of the lubrication action or the entire lubrication action from an initial amount of lubricant stored in the lubricant container before performing the lubrication action. Determining the amount of lubricant remaining in the container may allow to determine and/or predict a time, at which the container may be empty and/or at which the container should be replaced and/or refilled. In turn, this allows to ensure proper lubrication of the object.

According to an embodiment, the control circuitry is configured to monitor and/or determine, based on the sensor signal of the at least one sensor, a displacement of the piston relative to the at least one sensor, wherein the control circuitry is configured to compare the determined displacement of the piston relative to the at least one sensor with at least one threshold value. Therein, the at least one threshold value may refer to a threshold value for the displacement of the piston per lubrication action and/or a threshold value for a maximum displacement of the piston. The one or more threshold values may e.g. be stored in the data storage. Alternatively or additionally, the one or more threshold values may be retrieved from another source, e.g. via a communication circuitry of the lubricator.

Generally, the threshold value for the displacement per lubrication action may correspond to and/or may be indicative of a displacement of the piston during a single lubrication action and/or per lubrication action, which should result in dispensing a pre-defined and/or appropriate amount of lubricant during the lubrication. In other words, the threshold value for the displacement of the piston per lubrication action may be indicative of and/or correlate with a target amount of lubricant that should be dispensed during a single lubrication action. Accordingly, by comparing the determined and/or monitored displacement with the threshold value for the displacement of the piston per lubrication action, it may be ensured that the pre-defined and/or appropriate amount of lubricant has been dispensed during the lubrication action.

Further, the threshold value for the maximum displacement of the piston may be indicative of a position and/or displacement of the piston, when the container is substantially empty. Accordingly, by comparing the displacement of the piston with the threshold value for the maximum displacement, the amount of lubricant remaining in the container can be determined. Alternatively or additionally, it may be determined and/or predicted when the container will be empty. Optionally, upon reaching and/or exceeding the threshold value for the maximum displacement, a signal and/or warning signal may be generated by the control circuitry.

According to an embodiment, the control circuitry is configured to stop the electric motor when the determined displacement of the piston relative to the at least one sensor reaches or exceeds the at least one threshold value, such that the lubrication action is terminated. Therein, the at least one threshold value may refer to a threshold value for the displacement of the piston per lubrication action and/or a threshold value for a maximum displacement of the piston. This way, it may be ensured that the pre-defined and/or appropriate amount of lubricant has been dispensed during the lubrication action. Alternatively or additionally, it may be ensured that the electric motor is not powered or driven when the container is empty and/or the threshold value for the maximum displacement has been reached and/or exceeded.

According to an embodiment, the control circuitry is configured to monitor and/or determine, based on the sensor signal of the at least one sensor, an amount of lubricant dispensed from the output of the lubricant container during the lubrication action, wherein the control circuitry is configured to compare the determined amount of lubricant dispensed during the lubrication action with a threshold value for the amount of lubricant, and wherein the control circuitry is configured to stop the electric motor when the determined amount of lubricant dispensed from the output of the lubricant container during the lubrication action reaches or exceeds the threshold value for the amount of lubricant, such that the lubrication action is terminated. Generally, the threshold value for the amount of lubricant may refer to a target amount of lubricant that should be dispensed during the lubrication action. Further, the threshold value for the amount of lubricant may e.g. be stored in the data storage. Alternatively or additionally, the threshold value for the amount of lubricant may be retrieved from another source, e.g. via a communication circuitry of the lubricator.

According to an embodiment, the control circuitry is configured to detect a blockage of the output of the container (e.g. a partial or full blockage) by monitoring and/or determining, based on the sensor signal of the at least one sensor, the displacement of the piston over time, a distance between the sensor and the piston and/or an amount of lubricant dispensed from the output of the lubricant container over time (e.g. a specified and/or predefined time). Therein, the control circuitry can be configured to compare an initial distance, e.g. at a first time, between the sensor and the piston with a distance measured and/or determined at a second time after the first time, and/or by comparing the amount of the lubricant dispensed over a certain time period with a threshold value. For instance, if the distance has not changed or at least not significantly over time, and/or if substantially no lubricant has been dispensed, the blockage can be detected.

According to an embodiment, the lubricator further comprises a communication circuitry configured to transmit a signal indicative of and/or related to the determined at least one lubrication parameter. The communication circuitry may be a wired communication circuitry or a wireless communication circuitry. By way of example, the signal may be a warning signal indicating a blockage of the output of the container and/or any other lubrication parameter. Alternatively or additionally, the signal may be indicative of the amount of lubricant dispensed during the lubrication action. Alternatively or additionally, the signal may be indicative of the amount of lubricant remaining in the container after the lubrication action. Optionally, such signal may be a warning signal indicating that the remaining lubricant has reached a threshold value and/or that the container is substantially empty. This may allow to indicate to a user that the container should be replaced.

According to an embodiment, the control circuitry is further configured to compare the at least one lubrication parameter with at least one threshold value for the lubrication parameter, wherein the control circuitry is configured to trigger transmission of the signal via the communication circuitry, when the at least one lubrication parameter reaches or exceeds the at least one threshold value for the lubrication parameter.

By means of the communication circuitry, an enhanced functionality of the lubricator can be provided. For instance, this provides the possibility of setting one or more parameters of the lubricator and reading one or more sets of data without necessity of dismounting the lubricator from the lubrication site and even without coming too close to this site, as in many cases the automatic lubricators are placed in places with difficult or dangerous access. In such situation the communication circuitry, particularly providing wireless connectivity to the lubricator, can be advantageous as it can allow to reduce the number of LEDS, displays, switches and buttons mounted on the hardware, and in such a way decrease the cost while improving readability of data exchanged with the lubricator. For instance, the lubricator and/or the communication circuitry can comply with at least one wireless communication standard, such as e.g. Bluetooth or W-Fi, so that it can be accessed with a user device like a smartphone or a laptop rather than with a dedicated hardware. Hence, the lubricator might be able to exchange data, signals and/or commands with an external device which only needs to be equipped with corresponding software. Also, this can allow to avoid additional costs associated with a dedicated device designed only for communication with the lubricator. Moreover, a wireless communication can allow for placing the lubricator in hard-to-reach destinations without necessity of providing cables to connect to the device and change settings or read the data regarding the operation of the lubricator.

The communication circuitry may be and/or comprise a radio module that can be embedded into the lubricator, e.g. so that it is protected by the housing against damage, dust and humidity. This can be of particular advantage in an environment with heavy machinery where the lubricators are normally placed.

Further, based on the communication circuitry, operation of the lubricator can be monitored, e.g. without necessity of visual inspection of the lubricator mounted on a machine. Based on the communication circuitry, a self-monitoring feature, which can e.g. verify the status of the lubricator, can be implemented. For instance, a notification, a warning, a signal, a warning signal and/or an alarm message can be transmitted via the communication circuitry and/or a corresponding communication interface that is preferably configured for wireless transmission. For instance, this can allow to recognize if the lubricator is working properly or not, without visual inspection of the lubricator. Also, a signal regarding the status of the lubricator and/or the container can be received from the lubricator, e.g. on an external device.

The self-monitoring feature or functionality of the lubricator, which can be implemented in the control circuitry, can recognize a situation when an immediate action should be taken and e.g. send an alarm message. Optionally, a failure, e.g. by assessing that the level of the lubricant in the container is coming close to empty, can be predicted and a warning message can be sent before the actual failure occurs. This allows a service action to be planned in advance after the warning has been received.

According to an exemplary embodiment, the control circuitry is further configured to determine, estimate, compute and/or calculate a date, time, time instant and/or time period for a next service action for servicing the lubricator or at least a part thereof. The date, time, time instant and/or time period can for example be calculated based on monitoring one or more parameters, such as e.g. an amount of lubricant in the lubricant container, and the like. Alternatively or additionally, data and/or information related to one or more lubrication actions performed by the lubricator in the past and/or scheduled in future can be taken into account. For example, it can be determined how often or frequently lubricant is dispensed, how much lubricant is dispensed in each. This can allow to estimate and/or determine a remaining working time until a next service action, e.g. for a change of the lubricant container, should be carried out. Further, based on such information, the date, time, time instant and/or time period for the next service action can be determined and/or calculated. Therein, determining the date, time, time instant and/or time period may comprise determining a maintenance date for servicing the lubricator. Further, the determined date, time, time instant, time period and/or maintenance date may be transmitted via the communication circuitry, i.e. over wired or wireless communication interface, to another device which can communicate with the lubricator, such as e.g. a gateway, a laptop, a smartphone or any other device.

Generally, this can allow to reduce the number of maintenance actions as the exact date and/or time of the next maintenance action can be determined. Prediction of dates when the service should be carried out may further allow to minimize the number of unnecessary maintenance actions and to plan the work of the service team in advance.

A second aspect of the present disclosure relates the use of the lubricator and/or a lubrication system, as described above and in the following, for lubricating an object.

A third aspect of the present disclosure relates to a lubrication system for lubricating an object. The lubrication system comprises a lubricant container configured to contain and/or containing a lubricant and including a rotatable shaft with a piston to dispense the lubricant from an output of the lubricant container. The lubrication system further comprises a lubricator with a housing with a coupling section coupled with the lubricant container, an electric motor configured to drive the rotatable shaft of the lubricant container during at least one lubrication action, such that at least a part of the lubricant is dispensable from the lubricant container during the at least one lubrication action. Further, the lubricator comprises at least one sensor arranged within the housing and configured to provide a sensor signal indicative of a distance between the at least one sensor and the piston of the lubricant container. The lubricator further comprises a control circuitry configured to determine, based on the sensor signal of the at least one sensor, at least one lubrication parameter indicative of the at least one lubrication action.

A fourth aspect of the present disclosure relates to a method of operating an automatic, automated and/or at least partly automated lubricator couplable to and/or coupled to a lubricant container. The method comprises at least the steps of:
  actuating, with a control circuitry of the automatic lubricator, an electric motor of the lubricator to drive, during at least one lubrication action, a rotatable shaft of the lubricant container, thereby displacing a piston of the lubricant container coupled to the rotatable shaft;
  generating, with at least one sensor of the lubricator arranged within the housing, a sensor signal indicative of a distance between the at least one sensor and the piston of the lubricant container; and
  determining, with a control circuitry of the lubricator, at least one lubrication parameter indicative of the at least one lubrication action based on the sensor signal of the at least one sensor.

A fifth aspect of the present disclosure relates to a computer program, which, when executed by one or more processors of a lubricator and/or lubrication system, instructs the lubricator and/or lubrication system to carry out the steps of the method, as described above and in the following.

A sixth aspect of the present disclosure relates to a non-transitory computer-readable medium storing a computer program, which, when executed by one or more processors of a lubricator and/or lubrication system, instructs the lubricator and/or lubrication system to carry out the steps of the method, as described above and in the following.

It should be noted that any feature, element, step and/or function described above and in the following with reference to one aspect of the present disclosure equally applies to any other aspect of the present disclosure. Specifically, any feature, element, step, and/or function described above and in the following with respect to the lubricator equally applies to the lubrication system and/or the method, and vice versa.

Further, it should be noted that any embodiment described hereinabove with reference to one aspect of the present disclosure can be combined with any other embodiment of the same or any other aspect. This may mean that any dependent claim can depend from any of the preceding claims.

These and other aspects of the invention will be apparent from and elucidated with reference to the embodiments described hereinafter.

BRIEF DESCRIPTION OF THE DRAWINGS

In the following, the invention is described with reference to the appended figures which give background explanations and represent exemplary embodiments of the invention.

The figures are schematic only and not true to scale. In principle, identical or like parts, elements and/or steps are provided with identical or like reference symbols in the figures.

DETAILED DESCRIPTION OF EXEMPLARY EMBODIMENTS

Figure 1:
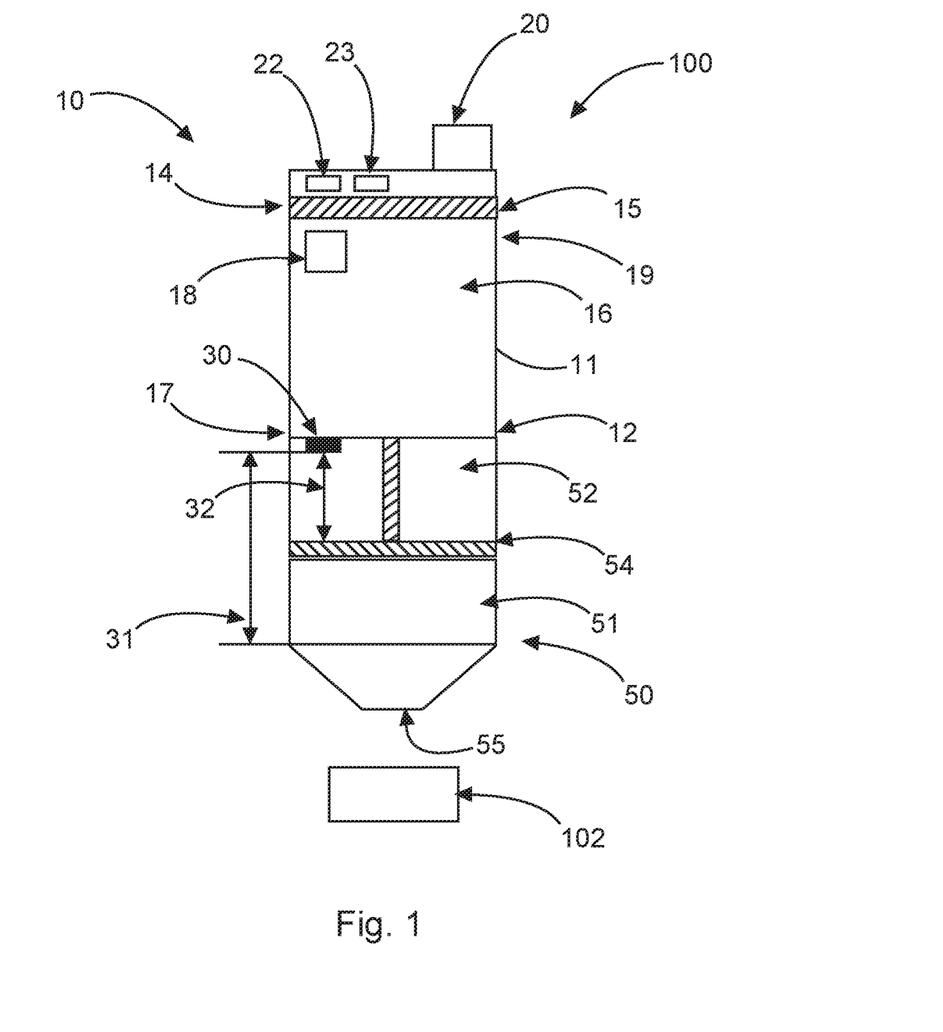
FIG. 1 shows a cross-sectional view of a lubrication system according to an exemplary embodiment, with the sensor being located beneath the electric motor.

FIG. 1 shows a cross-sectional view of a lubrication system 100 according to an exemplary embodiment.

The lubrication system 100 comprises a lubricator 10 with a housing 11 having a coupling section 12 which is coupled to a lubricant container 50 of the lubrication system 100. The container 50 can be detachably attached to the lubricator 10 and/or the housing 11 by any suitable connection, such as e.g. a threaded coupling and/or threaded connection.

The lubricant container 50 comprises a rotatable shaft 52 and/or rotatable screw 52, on which a piston 54 is displaceably arranged, mounted and/or attached. Further, the container 50 contains a lubricant 51 which is to be dispensed via an outlet 55 and/or output 55 of the container 50, e.g. during a lubrication action. Upon rotation of the rotatable shaft 52, the piston 54 is displaced in a direction towards the output 55, such that a part of the lubricant 51 is pushed out of the output 55.

For driving the rotatable shaft 52 of the container 50, the lubricator 10 comprises an electric motor 16 and a control circuitry 14 for controlling and/or actuating the electric motor 16. The control circuitry 14 can be arranged at least partly on a Printed Circuit Board 15, PCB, arranged on a top side of the lubricator 10 opposite to the coupling section 12, the container 50 and/or the output 55. The PCB 15, however, can be arranged anywhere else. The electric motor 16 comprises a rotating part (not shown) for driving the rotatable shaft and a static part (not shown). The static or immovable part may e.g. refer to a stator and/or a motor housing of the electric motor 16.

Optionally, the lubricator 10 may comprise a gearbox (not shown) which may be configured to change a rotational speed of the shaft 52 driven by the electric motor 16. For instance, based on the gearbox, the shaft 52 driven by the electric motor 16 via the gearbox, can be operated at a low rotational speed with higher force when the electric motor 16 operates with higher speed and lower force, and vice versa.

The control circuitry 14 is further coupled to a power supply 18, which provides the electrical power for driving the electric motor 16, the rotatable shaft 52 and/or the piston 54. The power supply 18 can comprise one or more batteries. Alternatively or additionally, the power supply 18 may be connected to a supply grid and/or a power supply system.

The lubricator 10 and/or the control circuitry 14 is configured to dispense a certain amount of lubricant 51, e.g. during a lubrication action, onto and/or into an object 102 that is to be lubricated, such as e.g. a part, portion and/or member of an industrial system, an apparatus and/or device. For instance, the object 102 may be a bearing 102.

Further, the lubricator 10 comprises at least one sensor 30 for determining a distance 32 between the sensor 30 and the piston 54 and/or for determining a displacement 32 of the piston 54 relative to the sensor 30. Therein, the sensor 30 is configured to provide a sensor signal indicative of the distance 32 between the sensor 30 and the piston 54 and/or the displacement 32 of the piston 54 relative to the sensor 30. Accordingly, the sensor signal, the distance 32 and/or displacement 32 may correlate with and/or be indicative of a distance between the piston 54 and any other static part of the lubricator 10.

Generally, the sensor 30 may e.g. be a time-of-flight sensor, an optical sensor, a Laser sensor, a Radar sensor or an ultrasound sensor.

The sensor 30 is arranged within and/or inside the housing 11 of the lubricator 10. In the example shown in FIG. 1, the sensor 30 is arranged at and/or adjacent an end 17 of the electric motor 16 and/or the lubricator 10 which end 17 faces and/or opposes the piston 54. Accordingly, the sensor 30 may be arranged and/or located adjacent and/or at the coupling section 12, a bottom side of the lubricator 10, and/or a bottom side of a motor housing.

The control circuitry 14 is configured to process the sensor signal of the sensor 30 and to determine, based on the sensor signal, one or more lubrication parameters indicative of the lubrication action. Therein, the one or more lubrication parameters may be one or more of an abnormal working condition of the lubricator 10, an abnormal working condition of the lubricant container 50, a (partial or complete) blockage of the output 55 of the lubricant container 50, an amount of lubricant 51 dispensed during at least a part of the lubrication action, an accumulated amount of lubricant 51 dispensed from the lubricant container 50 in a plurality of lubrication actions, an amount of lubricant 51 remaining in the lubricant container 50, a lubrication time period for the lubrication action, a lubrication frequency, and a time between consecutive lubrication actions. Also other lubrication parameters can be determined, such as e.g. a normal working condition of the lubricator 10 and/or a start time for a subsequent lubrication action.

Moreover, the control circuitry 14 can compute the one or more of the lubrication parameters based on the sensor signal and based on at least one container parameter which may be descriptive of at least one of a type of the lubricant container 50, a capacity of the lubricant container 50, a volume of the lubricant container 50, an initial volume of lubricant stored in the lubricant container 50, a geometry of the lubricant container 50, a height 31 of the lubricant container 50, and a diameter of at least a part of the lubricant container 50. Also the at least one container parameter can be stored in a data storage 23 of the lubricator 10. Alternatively or additionally, it can be retrieved and/or accessed by the control circuitry 14 via a communication circuitry 22 of the lubricator 10.

Further, the control circuitry 14 may be configured to determine and/or monitor, based on the sensor signal of the sensor 30, the displacement 32 of the piston 54 relative to the at least one sensor 30 and/or the distance 32 between the sensor 30 and the piston 54. Therein, the determined and/or monitored displacement 32 and/or distance 32 may refer to a displacement 32 during the lubrication action or to an overall displacement 32 of the piston 54, e.g. a displacement 32 resulting from a plurality of lubrication actions.

Generally, as the electrical motor 16 rotates, it rotates the rotatable shaft 52 and moves the piston 54 towards the output 55, thereby pushing lubricant 51 out of the container 50. Thus, when the level or amount of lubricant 51 in the container 50 is decreased, the distance 32 between the sensor 30 and the piston 54 is increased. Accordingly, by determining and/or monitoring the distance 32 between the sensor 30 and the piston 54 and/or the displacement 32 of the piston 54 relative to the sensor 30, the one or more lubrication parameters can be reliably detected.

Further, the control circuitry 14 may be configured to compare the determined displacement 32 and/or distance 32 with at least one threshold value. Therein, the at least one threshold value may refer to a threshold value for the displacement 32 of the piston 54 per lubrication action and/or a threshold value for a maximum displacement 32 of the piston 54. The one or more threshold values may e.g. be stored in a data storage 32 of the lubricator. Alternatively or additionally, the one or more threshold values may be retrieved from another source, e.g. via a communication circuitry 22 of the lubricator 10.

Optionally, a signal and/or warning signal can be triggered and/or transmitted by the control circuitry 14 via the communication circuitry 22, when the control circuitry 14 determines that the threshold value for the displacement 32 of the piston 54 per lubrication action and/or the threshold value for a maximum displacement 32 of the piston 54 is reached and/or exceeded. For instance, a signal and/or warning signal can be triggered by the control circuitry 14 and transmitted via the communication circuitry 22 when the remaining amount of lubricant reaches a certain threshold value. Again, this can ensure proper lubrication of the object 102, while reducing maintenance efforts and costs.

Generally, the threshold value for the displacement per lubrication action may correspond to and/or may be indicative of a displacement 32 of the piston 54 during a single lubrication action and/or per lubrication action, which should result in dispensing a pre-defined and/or appropriate amount of lubricant 51 during the lubrication. In other words, the threshold value for the displacement 32 of the piston 54 per lubrication action may be indicative of and/or correlate with a target amount of lubricant 51 that should be dispensed during a single lubrication action. Accordingly, by comparing the determined and/or monitored displacement 32 with the threshold value for the displacement 32 of the piston 54 per lubrication action, it may be ensured that the pre-defined and/or appropriate amount of lubricant 51 has been dispensed during the lubrication action.

Further, the threshold value for the maximum displacement 32 of the piston 54 may be indicative of the distance 32 and/or displacement 32 of the piston 54, when the container 50 is substantially empty. Accordingly, by comparing the displacement 32 of the piston 54 with the threshold value for the maximum displacement 32, the amount of lubricant 51 remaining in the container 50 can be determined. Alternatively or additionally, it may be determined and/or predicted when the container 50 will be empty.

Optionally, upon reaching and/or exceeding the threshold value for the maximum displacement 32, a signal and/or warning signal may be generated by the control circuitry 14 and/or transmitted via the communication circuitry 22.

Further, the control circuitry 14 may be configured to stop the electric motor 16 when the determined displacement 32 of the piston 54 relative to the sensor 30 reaches or exceeds the at least one threshold value, such that the lubrication action is terminated. Therein, the at least one threshold value may refer to a threshold value for the displacement 32 of the piston 54 per lubrication action and/or a threshold value for the maximum displacement 32 of the piston 54. This way, it may be ensured that the pre-defined and/or appropriate amount of lubricant 51 has been dispensed during the lubrication action. Alternatively or additionally, it may be ensured that the electric motor 16 is not powered or driven when the container 50 is empty and/or the threshold value for the maximum displacement 32 has been reached and/or exceeded.

Moreover, the control circuitry 14 may be configured to monitor and/or determine, based on the sensor signal of the at least one sensor 30, an amount of lubricant 51 dispensed from the output 55 of the lubricant container 50 during the lubrication action, wherein the control circuitry 14 may be configured to compare the determined amount of lubricant 51 dispensed during the lubrication action with a threshold value for the amount of lubricant 51, and wherein the control circuitry 14 may be configured to stop the electric motor 16 when the determined amount of lubricant 51 dispensed from the output 55 of the lubricant container 50 during the lubrication action reaches or exceeds the threshold value for the amount of lubricant 51, such that the lubrication action is terminated. Generally, the threshold value for the amount of lubricant 51 may refer to a target amount of lubricant 51 that should be dispensed during the lubrication action. Further, the threshold value for the amount of lubricant 51 may e.g. be stored in the data storage 23. Alternatively or additionally, the threshold value for the amount of lubricant 51 may be retrieved from another source, e.g. via a communication circuitry of the lubricator.

Further, the control circuitry 14 may be configured to compare the determined at least one lubrication parameter with a threshold value for the at least one lubrication parameter. Optionally, a signal and/or warning signal can be triggered and/or transmitted by the control circuitry 14 via the communication circuitry 22, when the control circuitry 14 determines that the threshold value for the at least one lubrication parameter is reached and/or exceeded.

For instance, the control circuitry 14 can be configured to detect a blockage of the output 55 of the container 50 (e.g. a partial or full blockage) by monitoring and/or determining, based on the sensor signal of the at least one sensor 30, the displacement of the piston 54 over time, a distance between the sensor 30 and the piston 54 and/or an amount of lubricant 51 dispensed from the output 55 of the lubricant container 50 over time (e.g. a specified and/or predefined time). Therein, the control circuitry 14 can be configured to compare an initial distance, e.g. at a first time, between the sensor 30 and the piston 54 with a distance measured and/or determined at a second time after the first time, and/or by comparing the amount of the lubricant 51 dispensed over a certain time period with a threshold value. For instance, if the distance has not changed or at least not significantly over time, and/or if substantially no lubricant 51 and/or has been dispensed, the blockage can be detected.

The communication circuitry 22 of the lubricator 10 can be a wired communication circuitry or a wireless communication circuitry. The communication circuitry 22 can be integrated into the housing 11. Therein, the communication circuitry 22 can comprise a corresponding communication interface. For instance, a signal or warning signal can be transmitted by the control circuitry 14 via the communication circuitry.

Due to the fact that the lubricators 10 are often placed in a location with difficult access and it is not always possible to provide wires to them, the communication circuitry 22 used for transmission of the signal, warning signal and/or alarm message preferably is a wireless communication circuitry 22 (although not necessarily).

Also any other information, data and/or signals can be transmitted and/or received via the communication circuitry 22. For instance, such information, data and/or signals can relate to at least one parameter characterizing the power supply 18, at least one parameter characterizing the lubricator 10 and/or at least one parameter characterizing the object 102 and/or a machine on which the lubrication system 100 is mounted.

For example, the communication circuitry 22 can comprise a radio communication module, preferably enabling transmission over one or more wireless protocols, such as e.g. Bluetooth or Wi-Fi. This allows accessing the lubricator 10 with an external device like a smartphone or a laptop, or other external devices. Also, the communication circuitry 22 can communicate, for example, with a main MCU over HCI or UART interface, or it might be an MCU with integrated radio communication.

The lubricator 10 further comprises an indicator 20 and/or display 20 configured to display at least one information item, e.g. an information item related to the determined at least one lubrication parameter. For instance, if a blockage of the output 55 is detected and/or if the container 50 is empty, this may be indicated on indicator 20. It should be noted, however, that any other information item can be shown or displayed on the indicator 20, such as e.g. an amount of lubricant 51 currently stored in the container 50.

Figure 2:
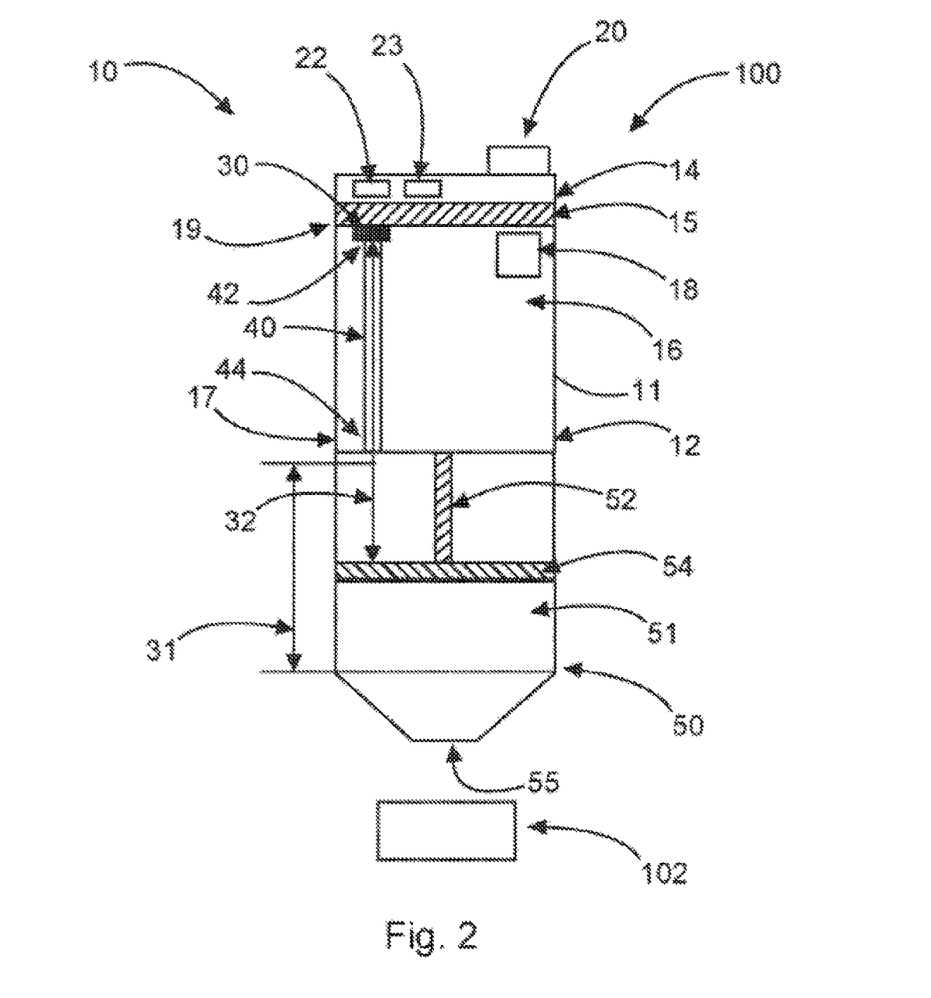
FIG. 2 shows a cross-sectional view of a lubrication system according to an exemplary embodiment, with the sensor being located above the electric motor.

FIG. 2 shows a cross-sectional view of a lubrication system 100 according to an exemplary embodiment. If not stated otherwise, the lubrication system 100 of FIG. 2 comprises the same features, functions and/or elements as the lubrication system 100 described with reference to FIG. 1.

In contrast to the example shown in FIG. 1, the lubrication system 100 of FIG. 2 comprises a wave guide 40 having a first end 42 and a second end 44 opposite to the first end 42, wherein the first end 42 of the wave guide 40 is coupled to the sensor 30 and the second end 44 of the wave guide 40 is directed towards the piston 54. In the example shown in FIG. 2, the sensor is arranged adjacent and/or at a further end 19 of the electric motor 16 opposite to the end 17 of the electric motor 16 that faces and/or opposes the piston 54. Therein, the sensor 30 is configured to transmit a measurement signal through the wave guide 40 and to receive a reflected signal component of the measurement signal which is a part of the measurement signal that is reflected by the piston 54 and/or a surface thereof. As can be seen in FIG. 2, the second end 44 of the wave guide 40 is arranged at and/or adjacent the end 17 of the electric motor 16 that faces the piston 54. By means of the wave guide 40, the sensor 30 can basically be arranged at an arbitrary position within the housing 11, while ensuring that the sensor 30 and/or the control circuitry 14 can reliably detect and/or determine the distance 32 between the sensor 30 and the piston 54.

Accordingly, the sensor 30 may emit and/or transmit the measurement signal into the wave guide 40 in a direction towards the piston 54. The measurement signal may then pass through the wave guide 40, wherein at least a part or component of the measurement signal may be reflected by the piston 54 and/or a surface thereof. The reflected part or component of the measurement signal may pass through the wave guide 40 back to the sensor 30, where it is received as the reflected signal component of the measurement signal. The sensor 30 may then determine the sensor signal indicative of the distance 32 between the sensor 30 and the piston 54 and/or the displacement 32 of the piston 54 relative to the sensor 30 based on the reflected signal component and/or based on the measurement signal. By way of example, the sensor signal may be indicative of a time-of-flight of the measurement signal and the reflected signal component thereof. In this context, it should be noted that the sensor 30 can be part of the control circuitry 14 and the control circuitry 14 can be configured to determine the sensor signal based on the reflected signal component and/or based on the measurement signal.

Generally, the at least one wave guide 40 may refer to any structure, e.g. a tunnel-like structure, allowing passage of at least a part of the measurement signal therethrough. The wave guide 40 may for example refer to a fiber optics, a channel, a measurement signal channel, or any other suitable structure.

Figure 3:
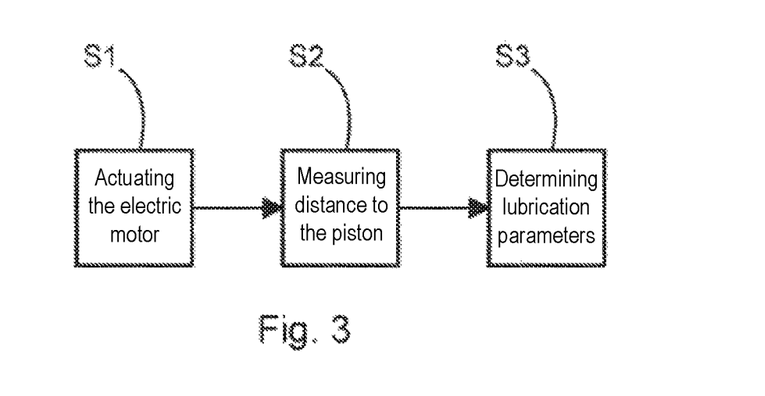
FIG. 3 shows a flowchart illustrating steps of a method of operating a lubricator according to an exemplary embodiment.

FIG. 3 shows a flowchart illustrating steps of a method of operating a lubricator 10 and/or a lubrication system 100 according to an exemplary embodiment. The method may likewise relate to a method of lubricating an object 102, e.g. using the lubricator 10 and/or the lubrication system 100 as described with reference to previous figures.

In a first step S1 an electric motor 16 of the lubricator 10 is actuated by the control circuitry 14 to drive, during at least one lubrication action, the rotatable shaft 52 of the lubricant container 50 and displace the piston 54 of the lubricant container 50 coupled to the rotatable shaft 52.

In a further step S2 a sensor signal indicative of a distance 32 between the at least one sensor 30 and the piston 54 of the lubricant container 51 is generated by the at least one sensor 30 of the lubricator 10, which is arranged within the housing 11 of the lubricator 10.

In yet a further step S3, at least one lubrication parameter indicative of the at least one lubrication action is determined by the control circuitry 14 based on the sensor signal of the at least one sensor 30.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

What is claimed is:

1. An automatic lubricator for lubricating an object, the lubricator comprising:
   a housing with a coupling section configured to couple with a lubricant container containing a lubricant, wherein the lubricant container comprises a rotatable shaft with a piston to dispense the lubricant from an output of the lubricant container;
   an electric motor configured to drive the rotatable shaft of the lubricant container during at least one lubrication action, such that at least a part of the lubricant is dispensable from the lubricant container during the at least one lubrication action;

at least one sensor arranged within the housing and configured to provide a sensor signal indicative of a distance between the at least one sensor and the piston of the lubricant container; and a control circuitry configured to determine, based on the sensor signal of the at least one sensor, at least one lubrication parameter indicative of the at least one lubrication action, the control circuitry is configured to monitor, based on the sensor signal of the at least one sensor, a displacement of the piston relative to the at least one sensor, the control circuitry is configured to compare the determined displacement of the piston relative to the at least one sensor with at least one threshold value.

2. The lubricator according to claim 1, wherein the at least one lubrication parameter is indicative of at least one of:
an abnormal working condition of the lubricator;
an abnormal working condition of the lubricant container;
a blockage of the output of the lubricant container;
an amount of lubricant dispensed during at least a part of the at least one lubrication action;
an accumulated amount of lubricant dispensed from the lubricant container in a plurality of lubrication actions;
an amount of lubricant remaining in the lubricant container;
a lubrication time period;
a lubrication frequency; and
a time between consecutive lubrication actions.

3. The lubricator according to claim 2, wherein the control circuitry is configured to determine the at least one lubrication parameter based on at least one container parameter, wherein the at least one container parameter is indicative of at least one of:
a type of the lubricant container;
a capacity of the lubricant container;
a volume of the lubricant container;
an initial volume of lubricant stored in the lubricant container;
a geometry of the lubricant container;
a shape of the lubricant container;
a height of the lubricant container; and
a diameter of at least a part of the lubricant container.

4. The lubricator according to claim 1, wherein the control circuitry is configured to determine the at least one lubrication parameter based on at least one container parameter, wherein the at least one container parameter is indicative of at least one of:
a type of the lubricant container;
a capacity of the lubricant container;
a volume of the lubricant container;
an initial volume of lubricant stored in the lubricant container;
a geometry of the lubricant container;
a shape of the lubricant container;
a height of the lubricant container; and
a diameter of at least a part of the lubricant container.

5. The lubricator according to claim 1, wherein the at least one sensor is arranged adjacent an end of the electric motor, such that the at least one sensor opposes the piston of the lubricant container, when the lubricant container is coupled to the housing.

6. The lubricator according to claim 5, wherein the at least one sensor is mechanically coupled to the end of the electric motor; and wherein the end of the electric motor faces the piston of the lubricant container, when the lubricant container is coupled to the housing of the lubricator.

7. The lubricator according to claim 1, further comprising:
at least one wave guide having a first end and a second end opposite to the first end;
wherein the first end of the wave guide is coupled to the at least one sensor and the second end of the wave guide is directed towards the piston; and
wherein the at least one sensor is configured to transmit a measurement signal through the at least one wave guide and to receive, via the at least one wave guide, a reflected signal component of the measurement signal reflected on the piston.

8. The lubricator according to claim 1, wherein the at least one sensor is a time-of-flight sensor.

9. The lubricator according to claim 1, wherein the at least one sensor is a laser sensor or an optical sensor.

10. The lubricator according to claim 1, wherein the at least one sensor is an ultrasound sensor.

11. The lubricator according to claim 1, wherein the at least one sensor is a Radar sensor.

12. The lubricator according to claim 1,
wherein the control circuitry is configured to determine, based on the sensor signal of the at least one sensor, a first distance between the at least one sensor of the lubricator and the piston of the lubricant container before performing the lubrication action and a second distance between the at least one sensor of the lubricator and the piston of the lubricant container after performing at least a part of the lubrication action or the entire lubrication action; and
wherein the control circuitry is configured to determine an amount of lubricant dispensed from the lubricant container during the at least part of the lubrication or the entire lubrication action based on the determined first distance and the second distance.

13. The lubricator according to claim 12,
wherein the control circuitry is configured to determine an amount of lubricant remaining in the lubricant container after performing the at least part of lubrication action or the entire lubrication action based on subtracting the determined amount of lubricant dispensed during the at least part of the lubrication action or the entire lubrication action from an initial amount of lubricant stored in the lubricant container before performing the lubrication action.

14. The lubricator according to claim 1, wherein the control circuitry is configured to stop the electric motor when the determined displacement of the piston relative to the at least one sensor reaches or exceeds the at least one threshold value, such that the lubrication action is terminated.

15. The lubricator according to claim 14, wherein the at least one threshold value is at least one of a threshold value for the displacement of the piston per lubrication action and a threshold value for a maximum displacement of the piston.

16. The lubricator according to claim 1, wherein the at least one threshold value is at least one of a threshold value for the displacement of the piston per lubrication action and a threshold value for a maximum displacement of the piston.

17. The lubricator according to claim 1,
wherein the control circuitry is configured to monitor, based on the sensor signal of the at least one sensor, an amount of lubricant dispensed from the output of the lubricant container during the lubrication action;

wherein the control circuitry is configured to compare the determined amount of lubricant dispensed during the lubrication action with a threshold value; and wherein the control circuitry is configured to stop the electric motor when the determined amount of lubricant dispensed from the output of the lubricant container during the lubrication reaches or exceeds the threshold value, such that the lubrication action is terminated.

18. The lubricator according to claim 1, further comprising:
a communication circuitry configured to transmit a signal indicative of the determined at least one lubrication parameter.

19. The lubricator according to claim 18,
wherein the control circuitry is further configured to compare the at least one lubrication parameter with at least one threshold value for the lubrication parameter; and
wherein the control circuitry is configured to trigger transmission of the signal via the communication circuitry, when the at least one lubrication parameter reaches or exceeds the at least one threshold value for the lubrication parameter.

20. A lubrication system for lubricating an object, the lubrication system comprising:
a lubricant container configured to contain a lubricant and including a rotatable shaft with a piston to dispense the lubricant from an output of the lubricant container;
a housing with a coupling section coupled with the lubricant container;
an electric motor configured to drive the rotatable shaft of the lubricant container during at least one lubrication action, such that at least a part of the lubricant is dispensable from the lubricant container during the at least one lubrication action;
at least one sensor arranged within the housing and configured to provide a sensor signal indicative of a distance between the at least one sensor and the piston of the lubricant container; and
a control circuitry configured to determine, based on the sensor signal of the at least one sensor, at least one lubrication parameter indicative of the at least one lubrication action, the control circuitry is configured to monitor, based on the sensor signal of the at least one sensor, a displacement of the piston relative to the at least one sensor, the control circuitry is configured to compare the determined displacement of the piston relative to the at least one sensor with at least one threshold value.

21. A method of operating an automatic lubricator couplable to a lubricant container, the method comprising:
actuating, with a control circuitry of the automatic lubricator, an electric motor of the lubricator to drive, during at least one lubrication action, a rotatable shaft of the lubricant container and displace a piston of the lubricant container coupled to the rotatable shaft;
generating, with at least one sensor of the lubricator arranged within the housing, a sensor signal indicative of a distance between the at least one sensor and the piston of the lubricant container;
determining, with a control circuitry of the lubricator, at least one lubrication parameter indicative of the at least one lubrication action based on the sensor signal of the at least one sensor;
monitoring, with the control circuitry of the lubricator, a displacement of the piston relative to the at least one sensor based on the sensor signal of the at least one sensor; and
comparing, with the control circuitry of the lubricator, the determined displacement of the piston relative to the at least one sensor with at least one threshold value.

* * * * *